(12) United States Patent
Liu

(10) Patent No.: US 11,947,218 B1
(45) Date of Patent: Apr. 2, 2024

(54) DISPLAY DEVICE

(71) Applicant: WUHAN CHINA STAR OPTOELECTRONICS TECHNOLOGY CO., LTD., Wuhan (CN)

(72) Inventor: Fancheng Liu, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/973,846

(22) Filed: Oct. 26, 2022

(30) Foreign Application Priority Data

Sep. 28, 2022 (CN) .......................... 202211191990.2

(51) Int. Cl.
*G02F 1/13357* (2006.01)
*G02F 1/1333* (2006.01)
*G02F 1/1335* (2006.01)

(52) U.S. Cl.
CPC .... *G02F 1/133608* (2013.01); *G02F 1/13338* (2013.01); *G02F 1/133605* (2013.01); *G02F 1/133607* (2021.01)

(58) Field of Classification Search
CPC . G02B 6/0021; G02B 6/0086; G02F 2201/58; G02F 1/133626; G02F 1/13338; G02F 1/133605; G02F 1/133607; G02F 1/133608

See application file for complete search history.

(56) References Cited

U.S. PATENT DOCUMENTS

| | | | |
|---|---|---|---|
| 10,768,356 B1 * | 9/2020 | Zhang | G02B 6/0055 |
| 2021/0072594 A1 * | 3/2021 | Zhang | G02F 1/133603 |
| 2021/0294015 A1 * | 9/2021 | Yin | G02B 6/0051 |

FOREIGN PATENT DOCUMENTS

| | | | | |
|---|---|---|---|---|
| CN | 209962052 U | * | 1/2020 | |
| CN | 112015003 A | * | 12/2020 | G02F 1/1336 |
| WO | WO-2020202925 A1 | * | 10/2020 | G02B 6/0025 |
| WO | WO-2020228251 A1 | * | 11/2020 | G02B 6/0046 |
| WO | WO-2021129709 A1 | * | 7/2021 | G02F 1/1336 |
| WO | WO-2023025053 A1 | * | 3/2023 | |

\* cited by examiner

*Primary Examiner* — Erin Kryukova
(74) *Attorney, Agent, or Firm* — The Roy Gross Law Firm, LLC; Roy Gross

(57) ABSTRACT

A display device is provided. The display device includes: a display panel including a first display area and a second display area, wherein the first display area at least partially surrounds the second display area; a main backlight module disposed corresponding to the first display area and providing a backlight source for the first display area; and a reinforcing backlight structure including a sub-backlight module and an optical conversion member, the optical conversion member is disposed at least corresponding to the second display area, and the optical conversion member is disposed on a light-emitting side of the sub-backlight module, and light emitted from the sub-backlight module enters the second display area after passing through the optical conversion member.

9 Claims, 6 Drawing Sheets

DISPLAY DEVICE

CROSS-REFERENCE TO RELATED PATENT APPLICATION

This application claims priority to Chinese patent application No. 202211191990.2, titled "DISPLAY DEVICE" and filed on Sep. 28, 2022 with the China National Intellectual Property Administration, which is incorporated by reference in the present application in its entirely.

FIELD OF DISCLOSURE

The present disclosure relates to the field of display technology, and more particularly, to a display device.

BACKGROUND OF DISCLOSURE

Liquid crystal display panels have been widely used in mobile phones. In order to achieve full-screen display, screen notching technology (in-panel notching technology) has been developed, and sensors such as cameras are arranged below notches.

However, the screen notching technology has a problem that a display panel cannot display images at a position of a notch, which affects an overall effect of images.

SUMMARY

The present application provides a display device, so as to solve a problem of a conventional notched screen being unable to display images where a notch is located, and unable to achieve a totally full screen.

The present application provides a display device including:
  a display panel including a first display area and a second display area, a main backlight module disposed corresponding to the first display area and providing a backlight source for the first display area, and a reinforcing backlight structure including a sub-backlight module and an optical conversion member.

The first display area at least partially surrounds the second display area. The optical conversion member is disposed at least corresponding to the second display area, the optical conversion member is disposed on a light-emitting side of the sub-backlight module, and light emitted from the sub-backlight module is emitted to the second display area after passing through the optical conversion member.

Optionally, in some embodiments of the present application, a first reflective film is disposed in the optical conversion member, and the first reflective film is inclined relative to the display panel.

The display device further includes an infrared sensor, and the infrared sensor and the sub-backlight module are respectively located on opposite sides of a plane where the first reflective film is located.

The first reflective film transmits one of infrared light and visible light, and reflects the other.

Optionally, in some embodiments of the present application, the optical conversion member includes a first light-transmitting surface corresponding to the sub-backlight module, a second light-transmitting surface corresponding to the second display area, and a third light-transmitting surface corresponding to the infrared sensor.

The infrared sensor is disposed corresponding to the second display area, the sub-backlight module is disposed corresponding to the first display area, the optical conversion member is disposed between the infrared sensor and the display panel, and the first reflective film transmits infrared light and reflects visible light.

Optionally, in some embodiments of the present application, the optical conversion member includes a first light-transmitting surface corresponding to the sub-backlight module, a second light-transmitting surface corresponding to the second display area, and a third light-transmitting surface corresponding to the infrared sensor.

The sub-backlight module is disposed corresponding to the second display area, the infrared sensor is disposed corresponding to the first display area, the optical conversion member is disposed between the sub-backlight module and the display panel, and the first reflective film transmits visible light and reflects infrared light.

Optionally, in some embodiments of the present application, an angle between the first reflective film and the display panel ranges from 35 degrees to 55 degrees.

Optionally, in some embodiments of the present application, the angle between the first reflective film and the display panel is 45 degrees.

Optionally, in some embodiments of the present application, the optical conversion member includes a first sub-prism and a second sub-prism that are spliced with each other, the first light-transmitting surface and the second light-transmitting surface are respectively different surfaces of the first sub-prism, and the third light-transmitting surface is a surface of the second sub-prism.

The first reflective film is arranged between a splicing surface of the first sub-prism and a splicing surface of the second sub-prism.

Optionally, in some embodiments of the present application, the first sub-prism and the second sub-prism are symmetrically arranged with respect to the first reflective film.

Optionally, in some embodiments of the present application, the first reflective film includes a first sub-reflective film and a second sub-reflective film, the first sub-reflective film and the second sub-reflective film are respectively inclined relative to the display panel and intersect with the second light-transmitting surface.

The sub-backlight module includes a first sub-backlight module and a second sub-backlight module, the first sub-backlight module and the infrared sensor are respectively located on opposite sides of a plane where the first sub-reflective film is located, the second sub-backlight module and the infrared sensor are respectively located on opposite sides of a plane where the second sub-reflective film is located.

Light emitted from the first sub-backlight module and light emitted from the second sub-backlight module are respectively reflected by the first sub-reflective film and the second sub-reflective film and then emit toward the second display area.

Optionally, in some embodiments of the present application, an angle between the first sub-reflective film and the display panel and an angle between the second sub-reflective film and the display panel both ranges from 35 degrees to 55 degrees.

Optionally, in some embodiments of the present application, an angle between the first sub-reflective film and the second sub-reflective film is 90 degrees, and the angle between the first sub-reflective film and the display panel is 45 degrees.

Optionally, in some embodiments of the present application, the optical conversion member includes a first sub-prism, a second sub-prism spliced with the first sub-prism, and a third sub-prism spliced with the second sub-prism, wherein the first sub-reflective film is arranged between a splicing surface of the first sub-prism and a splicing surface of the second sub-prism, and the second sub-reflective film is arranged between a splicing surface of the third sub-prism and another splicing surface of the second sub-prism.

The first light-transmitting surface includes a first sub-surface and a second sub-surface, and the first sub-surface is a surface of the first sub-prism and the second sub-surface is a surface of the third sub-prism. The second light-transmitting surface includes a third sub-surface and a fourth sub-surface, and the third sub-surface is another surface of the first sub-prism and the fourth sub-surface is another surface of the third sub-prism. The third light-transmitting surface is a surface of the second sub-prism.

Optionally, in some embodiments of the present application, the second sub-prism is in a plane-symmetric structure with respect to a central plane thereof, the central plane is perpendicular to the display panel, and the first sub-prism and the third sub-prism are arranged plane-symmetrically with respect to the central plane of the second sub-prism.

Optionally, in some embodiments of the present application, the optical conversion member includes a first sub-prism corresponding to the first display area and the second display area, and a second sub-prism corresponding to the second display area, the first sub-prism and the second sub-prism are spliced with each other, the second sub-prism is disposed on a side of the first sub-prism away from the display panel, and the first reflective film is arranged between a splicing surface of the first sub-prism and a splicing surface of the second sub-prism.

The optical conversion member is further provided with a second reflective film corresponding to the first display area and located on a surface of the first sub-prism, the second reflective film reflects visible light, and the second reflective film is inclined relative to the display panel.

The second light-transmitting surface is located between the first reflective film and the second reflective film, and the second light-transmitting surface is a surface of the first sub-prism. The first light-transmitting surface is inclined relative to the display panel, the first light-transmitting surface is located between the plane where the first reflective film is located and a plane where the second reflective film is located, and the first light-transmitting surface is another surface of the first sub-prism. The third light-transmitting surface is a surface of the second sub-prism.

Light of the sub-backlight module enters the second display area after being sequentially reflected by the second reflective film and the first reflective film.

Optionally, in some embodiments of the present application, the optical conversion member includes a first sub-prism and a second sub-prism that are spliced with each other, the second light-transmitting surface and the third light-transmitting surface are respectively different surfaces of the first sub-prism, and the first light-transmitting surface is a surface of the second sub-prism.

The first reflective film is arranged between a splicing surface of the first sub-prism and a splicing surface of the second sub-prism.

Optionally, in some embodiments of the present application, the first sub-prism and the second sub-prism are symmetrically arranged with respect to the first reflective film.

In an embodiment of the present application, a display device is provided. The display device includes: a display panel including a first display area and a second display area, wherein the first display area at least partially surrounds the second display area; a main backlight module disposed corresponding to the first display area and providing a backlight source for the first display area; and a reinforcing backlight structure including a sub-backlight module and an optical conversion member, wherein the optical conversion member is disposed at least corresponding to the second display area, the optical conversion member is disposed on a light-emitting side of the sub-backlight module, and light emitted from the sub-backlight module enters the second display area after passing through the optical conversion member. Compared with the prior art, in this application, the display panel is not notched, the second display area corresponds to a notched portion in the prior art, the reinforced backlight structure is disposed at a portion of the display device corresponding to the second display area of the display panel, and the visible light of the sub-backlight module provides a backlight source for the second display area through the optical conversion member, and the infrared light from outside is received by the infrared sensor after passing through the second display area and the optical conversion member, so that the sub-backlight module and the infrared sensor do not block light emitting or light receiving of each other, so as to achieve a function of displaying images in the second display area while the infrared sensor continues working. The infrared sensor can be an infrared camera. Therefore, the display device of the present application solves a problem of the conventional notched screen being unable to display images at the notched portion, thereby achieving a totally full screen.

BRIEF DESCRIPTION OF DRAWINGS

In order to describe technical solutions in the present invention clearly, drawings to be used in the description of embodiments will be described briefly below. Obviously, drawings described below are only for some embodiments of the present invention, and other drawings can be obtained by those skilled in the art based on these drawings without creative efforts.

DETAILED DESCRIPTION OF PRESENT EMBODIMENTS

The technical solution of the present application embodiment will be clarified and completely described with reference accompanying drawings in embodiments of the present application embodiment. Obviously, the present application described parts of embodiments instead of all of the embodiments. Based on the embodiments of the present application, other embodiments which can be obtained by a skilled in the art without creative efforts fall into the protected scope of the present application. In addition, it should be understood that specific implementations described here are only used to illustrate and explain the present application and are not used to limit the present application. In the present application, if no explanation is made to the contrary, orientation words such as "upper" and "lower" usually refer to upper and lower directions of a device in an actual use or a working state and specifically refer to drawing directions in drawings. Also, "inner" and "outer" refer to an outline of the device.

A display device is provided by an embodiment of the present application. The display device includes: a display panel including a first display area and a second display area, wherein the first display area at least partially surrounds the second display area; a main backlight module disposed corresponding to the first display area and providing a backlight source for the first display area; and a reinforcing backlight structure including a sub-backlight module and an optical conversion member, wherein the optical conversion member is disposed at least corresponding to the second display area, the optical conversion member is disposed on a light-emitting side of the sub-backlight module, and light emitted from the sub-backlight module enters the second display area after passing through the optical conversion member.

Detailed descriptions will be given respectively with a plurality of embodiments in the followings. It should be noted that a description order of the following embodiments is not intended to limit a preferred order of the embodiments.

First Embodiment

Figure 1:
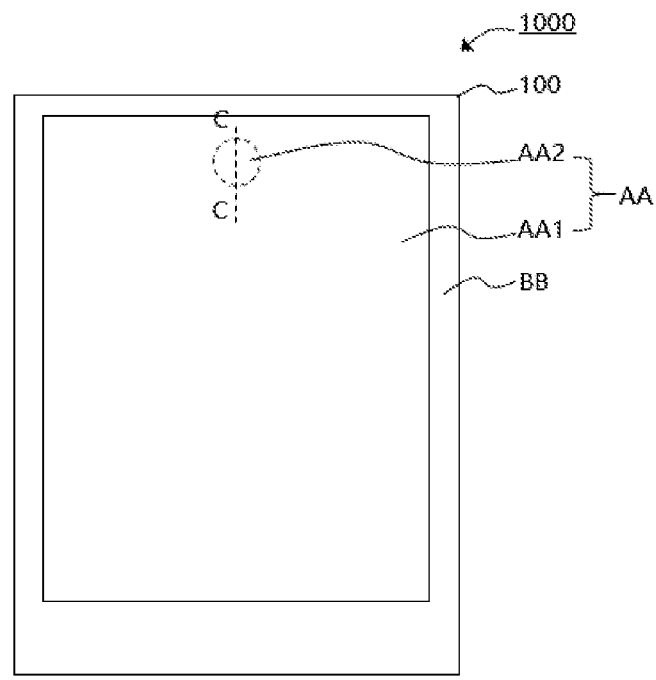
FIG. 1 is a top schematic view of a display device provided by an embodiment of the present application.
Figure 2:
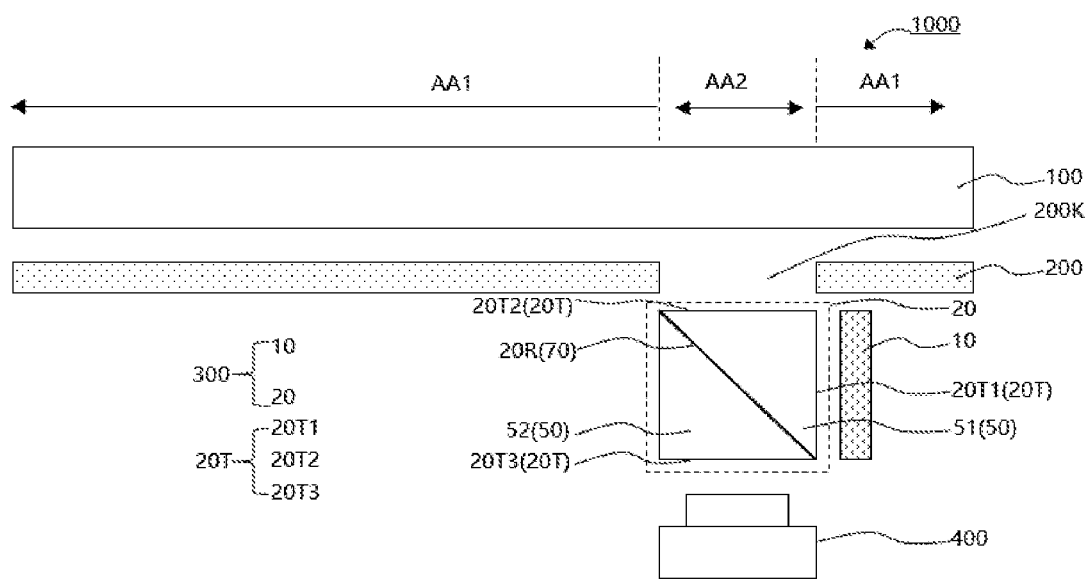
FIG. 2 is a first type of partial schematic cross-sectional view of a first type of display device provided by an embodiment of the present application.
Figure 3:
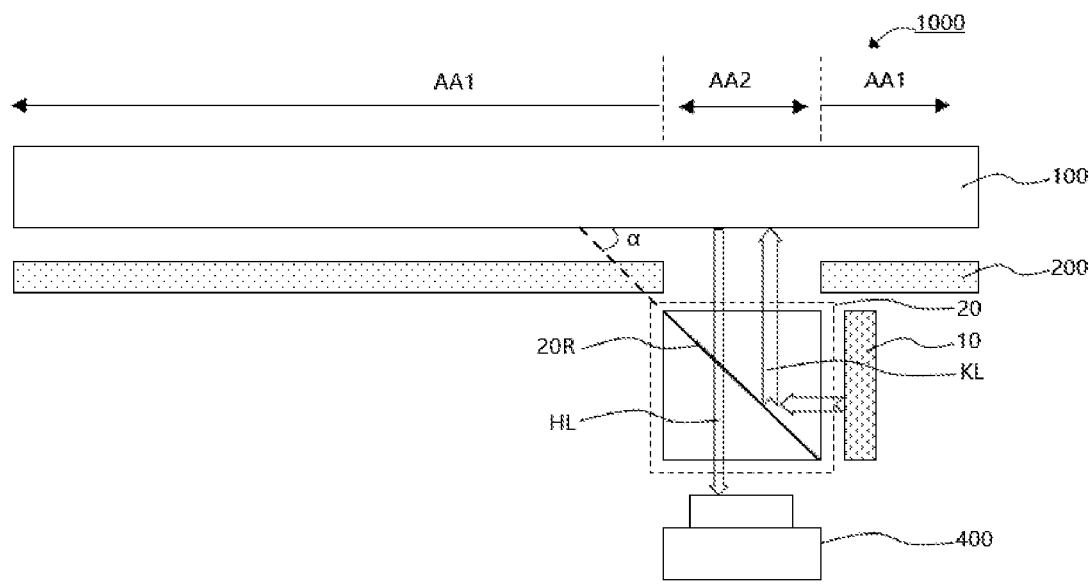
FIG. 3 is a second type of partial schematic cross-sectional view of the first type of display device provided by an embodiment of the present application.
Figure 4:
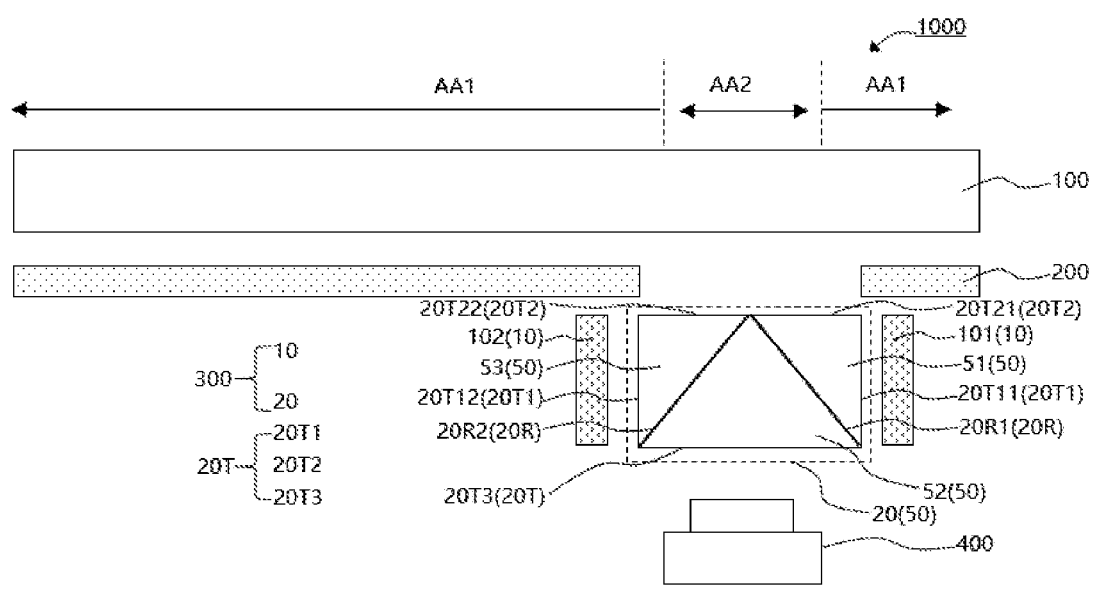
FIG. 4 is a first type of partial schematic cross-sectional view of a second type of display device provided by an embodiment of the present application.
Figure 5:
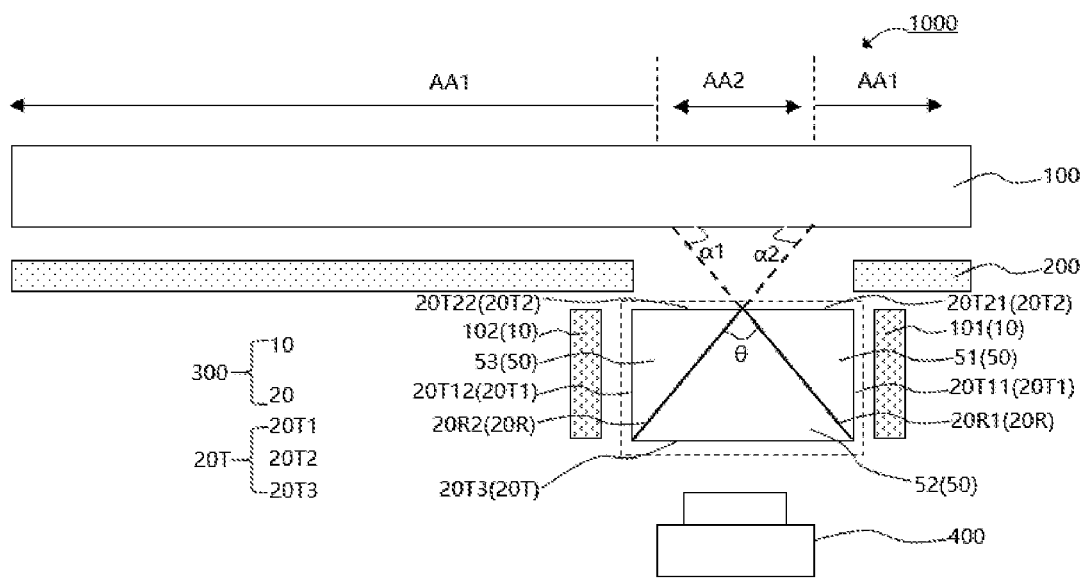
FIG. 5 is a second type of partial schematic cross-sectional view of the second type of display device provided by an embodiment of the present application.
Figure 6:
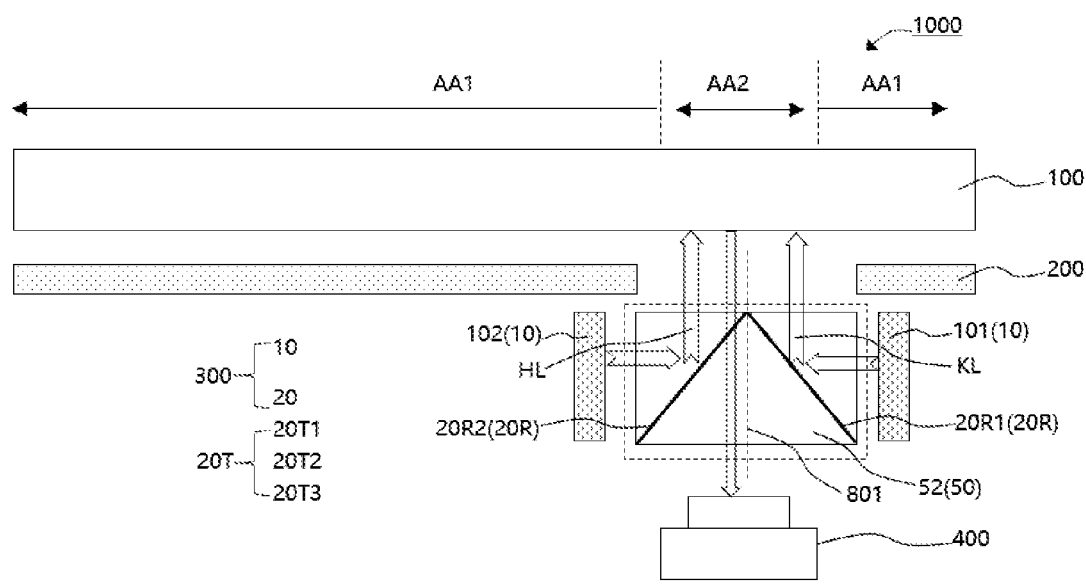
FIG. 6 is a third type of partial schematic cross-sectional view of the second type of display device provided by an embodiment of the present application.
Figure 7:
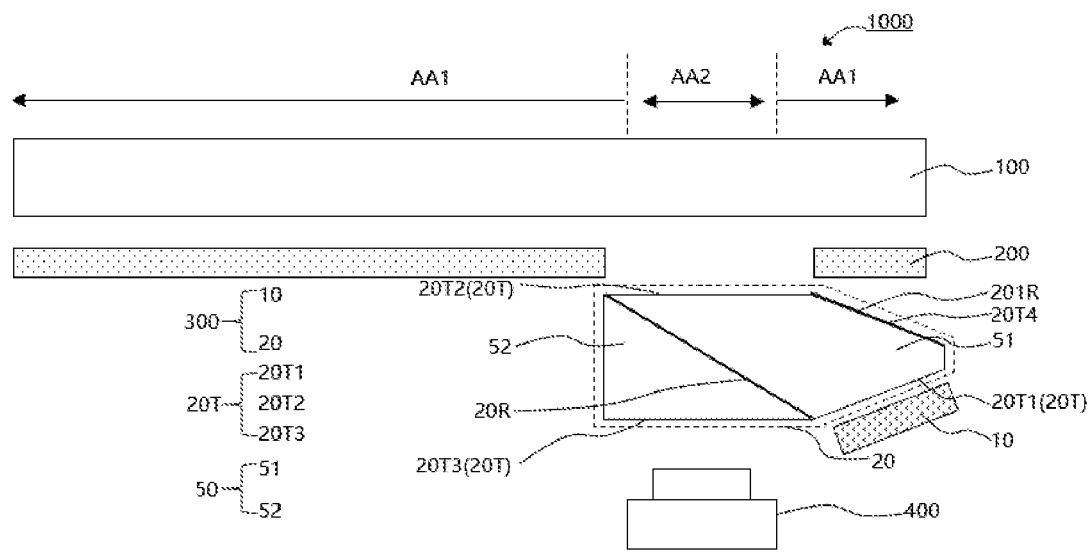
FIG. 7 is a first type of partial schematic cross-sectional view of a third type of display device provided by an embodiment of the present application.
Figure 8:
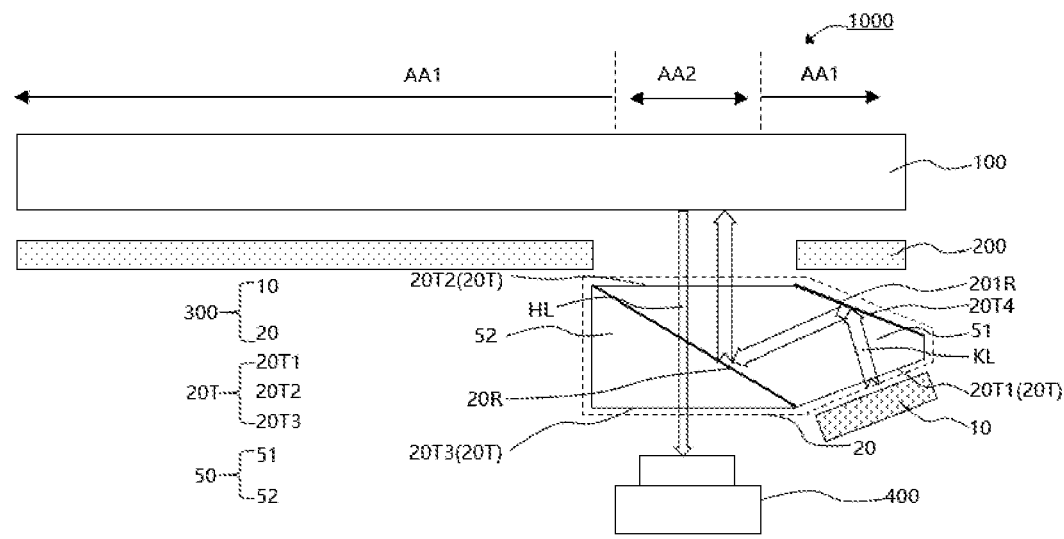
FIG. 8 is a second type of partial schematic cross-sectional view of the third type of display device provided by an embodiment of the present application.
Figure 9:
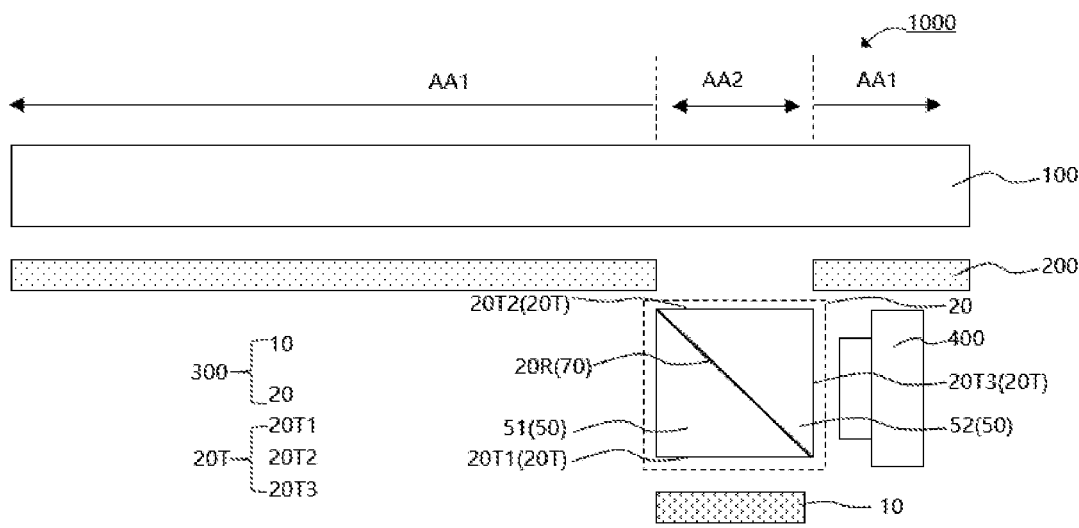
FIG. 9 is a first type of partial schematic cross-sectional view of a fourth type of display device provided by an embodiment of the present application.
Figure 10:
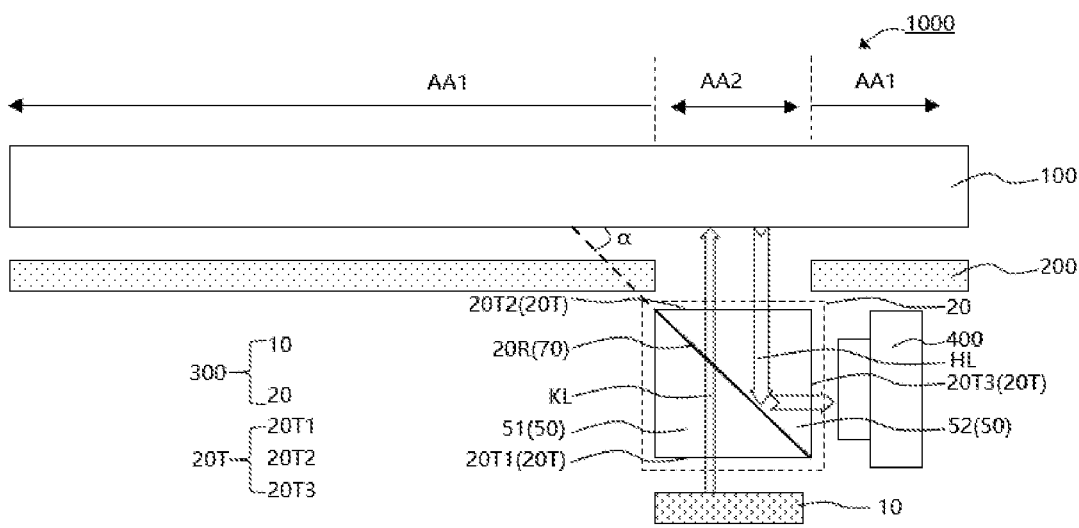
FIG. 10 is a second type of partial schematic cross-sectional view of the fourth type of display device provided by an embodiment of the present application.

References are made to FIG. 1 to FIG. 10. FIG. 1 is a top schematic view of a display device provided by an embodiment of the present application. FIG. 2 is a first type of partial schematic cross-sectional view of a first type of display device provided by an embodiment of the present application. FIG. 3 is a second type of partial schematic cross-sectional view of the first type of display device provided by an embodiment of the present application. FIG. 4 is a first type of partial schematic cross-sectional view of a second type of display device provided by an embodiment of the present application. FIG. 5 is a second type of partial schematic cross-sectional view of the second type of display device provided by an embodiment of the present application. FIG. 6 is a third type of partial schematic cross-sectional view of the second type of display device provided by an embodiment of the present application. FIG. 7 is a first type of partial schematic cross-sectional view of a third type of display device provided by an embodiment of the present application. FIG. 8 is a second type of partial schematic cross-sectional view of the third type of display device provided by an embodiment of the present application. FIG. 9 is a first type of partial schematic cross-sectional view of a fourth type of display device provided by an embodiment of the present application. FIG. 10 is a second type of partial schematic cross-sectional view of the fourth type of display device provided by an embodiment of the present application. FIG. 2 to FIG. 10 are schematic cross-sectional views of a dotted line C-C in FIG. 1. FIG. 3 is same as FIG. 2, except that different reference numerals are marked and light paths are illustrated in FIG. 3. FIG. 6 and FIG. 5 are same as FIG. 4, except that different reference numerals are marked in FIG. 5, and light paths are illustrated in FIG. 6. FIG. 8 is same as FIG. 7, except that light paths are illustrated in FIG. 8. FIG. 10 is same as FIG. 9, except that light paths are illustrated in FIG. 10.

A display device 1000 is provided by an embodiment of the present application. The display device 1000 includes a display panel 100, a main backlight module 200, and a reinforcing backlight structure 300. The display panel 100 includes a first display area AA1 and a second display area AA2. The first display area AA1 at least partially surrounds the second display area AA2. The main backlight module 200 is disposed corresponding to the first display area AA1 and provides a backlight source for the first display area AA1. The reinforcing backlight structure 300 includes a sub-backlight module 10 and an optical conversion member 20. The optical conversion member 20 is disposed at least corresponding to the second display area AA2. The optical conversion member 20 is disposed on a light-emitting side of the sub-backlight module 10, and light emitted from the sub-backlight module 10 enters the second display area AA2 after passing through the optical conversion member 20.

Specifically, the display panel 100 can be any type of liquid crystal display panel, which is not limited herein. The display panel 100 can include structures such as an array substrate, a color filter substrate, a polarizer, etc.

Specifically, the display panel 100 can include a non-display area BB and a display area AA. The display area AA includes the first display area AA1 and the second display area AA2, and the second display area AA2 is where a sensor is correspondingly arranged in the display device 1000. The sensor can be a camera sensor, a fingerprint reader sensor, etc. That is to say, the second display area AA2 corresponds to a notched portion of a conventional notched screen in the prior art.

Specifically, the main backlight module 200 is disposed corresponding to the first display area AA1 to provide the backlight source for the first display area AA1. The display panel 100 or the first display area AA1 is disposed on a light-emitting side of the main backlight module 200. A light emitting direction of the main backlight module 200 is directed toward or perpendicular to the display panel 100.

Specifically, the reinforcing backlight structure 300 includes the sub-backlight module 10 and the optical conversion member 20. The optical conversion member 20 is disposed at least corresponding to the second display area AA2, and the optical conversion member 20 is disposed on a side of the display panel 100. The optical conversion member 20 and the main backlight module 200 is disposed on a same side of the display panel 100. For example, as shown in the schematic cross-sectional views, the optical conversion member 20 can be disposed at least overlapping with the second display area AA2.

Specifically, the optical conversion member 20 is disposed on the light-emitting side of the sub-backlight module 10, the light emitted from the sub-backlight module 10 passes through the optical conversion member 20 and then enters the second display area AA2, and after passing through the optical conversion member 20, the light emitted from the sub-backlight module 10 is provided as a backlight source of the second display area AA2. A light emitting direction of the sub-backlight module 10 is directed toward the optical conversion member 20, and the light from the sub-backlight module 10 passes through the optical conversion member 20 and then enters the second display area AA2, so that the second display area AA2 displays images.

Specifically, ambient light first passes through the second display area AA2, then passes through the optical conversion member 20, and enters an infrared sensor 400. When the infrared sensor 400 is an infrared camera, the infrared sensor 400 can achieve functions such as photographing, recording, etc.

Specifically, the optical conversion member 20 separates infrared light and visible light. The optical conversion member 20 makes the sub-backlight module 10 not block light receiving of the infrared sensor 400, and the infrared sensor 400 does not block light emitted from the sub-backlight module 10, thereby achieving a function of displaying images in the second display area AA2 while the infrared sensor 400 continues working.

In this embodiment, the display panel 100 is not notched. The second display area AA2 corresponds to the notched portion in the prior art. The display device 1000 is provided with the reinforcing backlight structure 300 corresponding to a position where the second display area AA2 of the display panel 100 is. The optical conversion member 20 separates the infrared light and the visible light, the light of the sub-backlight module 10 provides the backlight for the second display area AA2 after passing through the optical conversion member 20, and the infrared light from ambience is then received by the infrared sensor 400 after passing through the second display area AA2 and the optical conversion member 20, so that the sub-backlight module 10 and the infrared sensor 400 do not block light emitting or light receiving of each other, so as to achieve the function of displaying images in the second display area AA2 while the infrared sensor 400 continues working. The infrared sensor 400 can be an infrared camera. Therefore, the display device 1000 of this embodiment solves a problem of the conventional notched screen being unable to display images at the notched portion, thereby achieving a totally full screen.

In some embodiments, the optical conversion member 20 includes a first reflective film 20R, and the first reflective film 20R is inclined relative to the display panel 100. The display device 1000 further includes the infrared sensor 400, and the infrared sensor 400 and the sub-backlight module 10 are respectively disposed on opposite sides of a plane where the first reflective film is located. The first reflective film 20R transmits one of infrared light and visible light, and reflects the other.

Specifically, the optical conversion member 20 includes the first reflective film 20R, i.e., the first reflective film 20R can be arranged inside the optical conversion member 20. When the optical conversion member 20 is spliced/assembled with two or more components, the first reflective film 20R is located on an inner surface of the optical conversion component 20 of the spliced/assembled components. For example, the first reflective film 20R is disposed at where two components splice.

It should be noted that, in some other embodiments, the first reflective film 20R can be disposed on an outer surface of the optical conversion member which is not limited herein.

Specifically, the first reflective film 20R is inclined relative to the display panel 100, i.e., the plane where the first reflective film 20R is located is inclined relative to the display panel 100. For example, as shown the cross-sectional view of FIG. 3, an angle between the first reflective film 20R and the display panel 100 is $\alpha$, and an angle between an extension line of the first reflective film and a surface of the display panel 100 is $\alpha$.

Specifically, the display device 1000 further includes the infrared sensor 400. The infrared sensor 400 can work through receiving or emitting infrared light. The sensor can be a camera sensor, a fingerprint reader sensor, etc., but not limited thereto.

Specifically, the infrared sensor 400 and the sub-backlight module 10 are located on the opposite sides of the plane where the first reflective film 20R is located, i.e., the infrared sensor 400 and the sub-backlight module 10 are located on different sides of the first reflective film 20R, or the infrared sensor 400 and the sub-backlight module 10 are respectively located on different sides of the plane where the first reflective film 20R is located, and the infrared sensor 400 and the sub-backlight module 10 are located outside the optical conversion member 20.

Specifically, the first reflective film 20R transmits one of infrared light and visible light, and reflects the other, i.e., the first reflective film 20R transmits infrared light and reflects visible light, or the first reflective film 20R transmits visible light and reflects infrared light.

Specifically, through having the first reflective film 20R, which is configured for transmitting one of infrared light and visible light, and reflecting the other, the visible light emitted by the sub-backlight module 10 and the infrared light received by the infrared sensor 400 are separated and are located in different positions, so that the sub-backlight module 10 and the infrared sensor 400 can be arranged in different positions, and the sub-backlight module and the infrared sensor 400 do not block the light emitting or the light receiving of each other, thus achieving the function of the second display area AA2 displaying images while the infrared sensor 400 continues working. The infrared sensor 400 can be an infrared camera. Therefore, the display device 1000 of this embodiment solves a problem of the conventional notched screen being unable to display images at the notched portion, thereby achieving a totally full screen.

In some embodiments, a surface of the optical conversion member 20 includes a light-transmitting surface 20T. The light-transmitting surface 20T includes a first light-transmitting surface 20T1 corresponding to the sub-backlight module 10, a second light-transmitting surface 20T2 corresponding to the second display area AA2, and the third light-transmitting surface 20T3 corresponding to the infrared sensor 400.

Specifically, the surface of the optical conversion member 20 includes a light-transmitting surface 20T, i.e., the light-transmitting surface 20T can transmit visible light or infrared light.

Specifically, the light-transmitting surface 20T includes a first light-transmitting surface 20T1 corresponding to the sub-backlight module 10, a second light-transmitting surface 20T2 corresponding to the second display area AA2, and a third light-transmitting surface 20T3 corresponding to the infrared sensor 400. The first light-transmitting surface 20T1 can transmit at least visible light, the second light-transmitting surface 20T2 can transmit visible light and infrared light, and the third light-transmitting surface 20T3 can transmit at least infrared light.

Further, in some implementations, the first light-transmitting surface the second light-transmitting surface 20T2, and the third light-transmitting surface 20T3 can all transmit visible light and infrared light, and the first light-transmitting surface 20T1, the second light-transmitting surface 20T2, and the third light-transmitting surface 20T3 are not undergone through an optional light-transmitting treatment, i.e., the sub-backlight module 10 and the infrared sensor 400 are located at different positions through the first reflective film 20R, so that no blocking problem occurs.

Specifically, the second display area AA2, the sub-backlight module and the infrared sensor 400 correspond to or face different ones of the light-transmitting surfaces 20T, respectively. That is to say, the sub-backlight module and the infrared sensor 400 are located at different positions, and blocking and interfering problem do not occur, so that the full screen can totally be achieved.

It should be noted that the infrared light can come from ambience. For example, the infrared sensor 400 can be an infrared camera and utilizes the infrared light from ambience to shoot. The infrared light can also come from finger reflection. For example, the infrared sensor 400 can a fingerprint reader and utilizes infrared light reflected from a finger to perform fingerprint recognition, a source of the infrared light is not limited herein.

Second Embodiment

This embodiment is similar to any one of the display device 1000 described in the first embodiment, and differences lie in that features of the display device 1000 are further defined. References are made to FIG. 2 to FIG. 8.

In some embodiments, the infrared sensor 400 is disposed corresponding to the second display area AA2, the sub-backlight module 10 is disposed corresponding to the first display area AA1, the optical conversion member 20 is disposed between the infrared sensor 400 and the display panel 100, and the first reflective film 20R transmits infrared light and reflects visible light.

Specifically, the optical conversion member 20 includes the first light-transmitting surface 20T1 corresponding to the sub-backlight module 10, the second light-transmitting surface 20T2 corresponding to the second display area AA2, and the third light-transmitting surface 20T3 corresponding to the infrared sensor 400.

Specifically, the infrared sensor 400 is disposed corresponding to the second display area AA2, and the optical conversion member 20 is disposed between the infrared sensor 400 and the display panel 100. That is to say, the optical conversion member 20 is disposed between the second display area AA2 and the infrared sensor 400, and the second display area AA2, the optical conversion member 20, and the infrared sensor 400 are overlappingly disposed, as shown in the schematic cross-sectional view.

Specifically, the sub-backlight module 10 is disposed corresponding to the first display area AA1, and the sub-backlight module 10 provides the backlight source for the second display area AA2, but as for positions, the sub-backlight module 10 is disposed corresponding to the first display area AA1, i.e., the sub-backlight module 10 is disposed on a side of the first display area AA1, and the sub-backlight module 10 provides the backlight source for the second display area AA2, but does not block ambient light from entering the infrared sensor 400 through the second display area AA1 and the optical conversion member 20.

Specifically, the first reflective film 20R transmits infrared light and reflects visible light, and the first reflective film 20R reflects the visible light emitted by the sub-backlight module 10 to the second display area AA2, so that the second display area displays images. The first reflective film 20R transmits infrared light, so that the infrared light from outside can reach the infrared sensor 400 through the first reflective film 20R, and the sub-backlight module 10 and the infrared sensor 400 do not interfere the light emitting or the light receiving of each other, so as to achieve the function of displaying images in the second display area AA2 while the infrared sensor 400 continues working. The infrared sensor 400 can be an infrared camera. Therefore, the display device 1000 of this embodiment solves the problem of the conventional notched screen being unable to display images at the notched portion, thereby achieving the totally full screen.

Third Embodiment

This embodiment is similar to any one of the display device 1000 described in the second embodiment, and differences are further described in detail in specific implementations of the display device 1000 as follows. References are made to FIG. 2 and FIG. 3.

In some embodiments, an angle between the first reflective film 20R and the display panel ranges from 35 degrees to 55 degrees.

Specifically, as shown in the cross-sectional view of FIG. 3, an angle between an extension line of the first reflective film 20R and the surface of the display panel 100 is $\alpha$, and the angle $\alpha$ between the first reflective film 20R and the display panel 100 is greater than or equal to 35 degrees, and less than or equal to 55 degrees.

Specifically, an appropriate range of the angle $\alpha$ between the first reflective film 20R and the display panel 100 is selected, so that the light from the sub-backlight module 10 can reach the second display area AA2 efficiently.

In some embodiments, the angle between the first reflective film 20R and the display panel 100 is 45 degrees.

Specifically, the angle $\alpha$ between the first reflective film 20R and the display panel 100 is 45 degrees. At this time, the sub-backlight module 10 is disposed as a normal emitting light from the sub-backlight module 10 being parallel to the display panel, the normal emitting light from the sub-backlight module 10, after being reflected by the first reflective film 20R, enters the second display area AA2 in a direction perpendicular to the display panel 100. The light emitted from the sub-backlight module 10 also includes non-normal emitting light. The normal emitting light is reflected by the first reflective film 20R and then perpendicularly enters the second display area AA2. The non-normal emitting light in different directions can uniformly enter the second display area AA2, and the normal emitting light from the sub-backlight module 10 is reflected by the first reflective film 20R and then perpendicularly enter all portions of the second display area AA2, so that the light from the sub-backlight module 10 that enters the second display area AA2 in all directions are uniformed and symmetrical, which enhances brightness uniformity of the second display AA2 when displaying images.

It should be noted that the normal emitting light refers to light emitted perpendicular to the light-emitting surface of the sub-backlight module 10, and the non-normal emitting light refers to the light that is not perpendicular to the light-emitting surface of the sub-backlight module 10.

In some embodiments, the optical conversion member 20 includes a first sub-prism 51 and a second sub-prism 52 spliced with each other. The first light-transmitting surface 20T1 and the second light-transmitting surface 20T2 are different surfaces of the first sub-prism 51, respectively. The third light-transmitting surface 20T3 is a surface of the second sub-prism 52. The first reflective film 20R is disposed between a splicing surface of the first sub-prism 51 and a splicing surface of the second sub-prism 52.

Specifically, the optical conversion 20 adopts a prism group 50. The prism group 50 includes two sub-prisms spliced with each other. The first reflective film 20R is arranged on splicing surfaces 70 of the two sub-prisms. The first light-transmitting surface 20T1 and the third light-transmitting surface are surfaces of the two sub-prisms, respectively. The second light-transmitting surface 20T2 is a surface of one of the sub-prisms.

Specifically, the optical conversion 20 adopts a prism group 50. The prism group 50 includes the two sub-prisms spliced with each other. As shown in FIG. 2, the prism group 50 includes the first sub-prism 51 and the second sub-prism 52 spliced with each other. The first sub-prism 51 and the second sub-prism 52 are located on two sides of the first reflective film 20R, respectively. The first sub-prism 51 and the second sub-prism 52 can be adhered and spliced by an adhesive layer, such as an optical adhesive layer (optical clear resin, OCR, or optical clear adhesive, OCA), but not limited thereto.

Specifically, the first reflective film 20R is disposed between the splicing surface of the first sub-prism 51 and the splicing surface of the second sub-prism 52, and the first sub-prism 51 or the second sub-prism 52 are provided with the reflective film 20R on the splicing surfaces, respectively. For example, the first reflective film 20R is a coating layer that transmits infrared light and reflects visible light.

Furthermore, material of the first reflective film 20R can include titanium pentoxide ($Ti_3O_5$) and silicon oxide ($SiO_2$). For example, the first reflective film 20R is a multi-layer structure of titanium pentoxide and silicon oxide.

Specifically, the first light-transmitting surface 20T1 and the second light-transmitting surface 20T2 are respectively different surfaces of the first sub-prism 51, and the third light-transmitting surface 20T3 is a surface of the second sub-prism 52. The first light-transmitting surface 20T1 is the surface of the first sub-prism 51 adjacent to the sub-backlight module 10, the second light-transmitting surface 20T2 is the surface of the first sub-prism 51 adjacent to the second display area AA2, and the third light-transmitting surface 20T3 is the surface of the second sub-prism 52 adjacent to the infrared sensor 400.

Furthermore, the prism group 50, the sub-prisms, the first sub-prism 51, and the second sub-prism 52 can all made of optical glass, which is not limited herein.

It should be noted that the first sub-prism 51 and the second sub-prism 52 are arranged on both sides of the first reflective film 20R, and refractive indices on both of the sides of the first reflective film 20R are a same, as shown in FIG. 3, which can prevent an infrared light HL from being greatly refracted when passing through the splicing surfaces 70, so that the infrared light HL entering the infrared sensor 400 are prevented from crosstalk and confusion, and accuracy and sensitivity of the infrared sensor 400 while working are enhanced. FIG. 3 also illustrates that a visible light KL emitted by the sub-backlight module 10 enters the second display area AA2 after being reflected by the first reflective film 20R.

In some embodiments, the first sub-prism 51 and the second sub-prism 52 are symmetrically arranged with respect to the first reflective film 20R.

Specifically, the first sub-prism 51 and the second sub-prism 52 are symmetrically arranged with respect to the first reflective film 20R. At this time, the angle between the first reflective film 20R and the display panel 100 is 45 degrees, and the normal emitting light from the sub-backlight module 10, after being reflected by the first reflective film 20R, enters the second display area AA2 in a direction perpendicular to the display panel 100. Therefore, the infrared light passing through the second display area AA2 perpendicularly can enter the infrared sensor 400 perpendicularly, and the brightness uniformity of the second display AA2 when displaying images is enhanced, while the accuracy and the sensitivity of infrared sensor 400 while working are enhanced.

Fourth Embodiment

This embodiment is similar to any one of the display device 1000 described in the second embodiment, and differences are further described in detail in specific implementations of the display device 1000 as follows. References are made to FIG. 4 and FIG. 6.

In some embodiments, the first reflective film 20R includes the first sub-reflective film 20R1 and the second sub-reflective film 20R2. The first sub-reflective film 20R1 and the second sub-reflective film 20R2 are respectively inclined relative to the display panel 100 and are intersected at the second light-transmitting surface 20T2. The sub-backlight module 10 includes a first sub-backlight module 101 and a second sub-backlight module 102, and the first sub-backlight module 101 and the infrared sensor 400 are respectively located on two opposite sides of a plane where the first sub-reflective film 20R1 is located. The second sub-backlight module 102 and the infrared sensor 400 are respectively located on opposite sides of a plane where the second sub-reflective film 20R2 is located. Light emitted from the first sub-backlight module 101 and light emitted from the second sub-backlight module 102 are respectively reflected by the first sub-reflective film 20R1 and the second sub-reflective film 20R2 and then emit toward the second display area AA2.

Specifically, the first sub-reflective film 20R includes the first sub-reflective film 20R1 and the second sub-reflective film 20R2. The first sub-reflective film 20R1 and the second sub-reflective film 20R2 have a same property, and can both transmit infrared light and reflect visible light.

Specifically, the first sub-backlight module 101 and the infrared sensor 400 are respectively located on the opposite sides of the plane where the first sub-reflective film 20R1 is located, and the second sub-backlight module 102 and the infrared sensor 400 are respectively located on the opposite sides of the plane where the second sub-reflective film 20R2 is located. The first sub-reflective film 20R1 reflects the light emitted from the first sub-backlight module 101 to the second display area AA2, and the second sub-reflective film 20R2 reflects the light emitted from the second sub-backlight module 102 to the second display area AA2.

Specifically, in this embodiment, through having the first sub-reflective film 20R1 and the second sub-reflective film 20R2 provided, and having the first sub-backlight module 101 and the second sub-backlight module 102 provided, brightness uniformity of the light entering the second display area AA2 can be further enhanced, thereby further enhancing the brightness uniformity of the second display AA2 when displaying images.

In some embodiments, an angle between the first sub-reflective film and the display panel 100, and an angle between the second sub-reflective film 20R2 and the display panel 100 respectively ranges from 35 degrees to 55 degrees.

Specifically, as shown in FIG. 5, an angle α1 between the first sub-reflective film 20R1 and the display panel 100 ranges from 35 degrees to 55 degrees, and an angle α2 between the second sub-reflective film 20R2 and the display panel 100 ranges from 35 degrees to 55 degrees.

Specifically, an appropriate range of the angle α1 between the first sub-reflective film 20R1 and the display panel 100 and an appropriate range of the angle α2 between the second sub-reflective film 20R2 and the display panel 100 are selected, so that the light from the first sub-backlight module 101 and the second sub-backlight module 102 can both reach the second display area AA2 efficiently.

In some embodiments, an angle between the first sub-reflective film and the second sub-reflective film 20R2 is 90 degrees, and the angle between the first sub-reflective film 20R1 and the display panel 100 is 45 degrees.

Specifically, as shown in FIG. 5, an angle θ between the first sub-reflective film 20R1 and the second sub-reflective film 20R2 is 90 degrees, the angle α1 between the first sub-reflective film 20R1 and the display panel 100 is degrees, and the angle α2 between the second sub-reflective film 20R2 and the display panel 100 is 45 degrees. At this time, a normal emitting light of the first sub-backlight module 101, after being reflected by the first sub-reflective film 20R1, enters the second display area AA2 in the direction perpendicular to the display panel 100; and a normal emitting light of the second sub-backlight module 102, after being reflected by the second sub-reflective film 20R2, enters the second display area AA2 in the direction perpendicular to the display panel 100, so that the light emitted from the first sub-backlight module 101 and the light emitted from the second sub-backlight module 102 from all directions are uniform and symmetrical, and the normal emitting light of the first sub-backlight module 101 and the second sub-backlight module 102 enter all portions of the second display area AA2, which enhances the brightness uniformity of the second display AA2 when displaying images.

In some embodiments, the optical conversion member 20 includes the first sub-prism 51, the second sub-prism 52 spliced with the first sub-prism 51, and a third sub-prism 53 spliced with the second sub-prism 52. The first sub-reflective film 20R1 is arranged between the splicing surface of the first sub-prism 51 and the splicing surface of the second sub-prism 52, and the second sub-reflective film 20R2 is arranged between a splicing surface of the third sub-prism 53 and another splicing surface of the second sub-prism 52. The first light-transmitting surface 20T1 includes a first sub-surface 20T11 and a second sub-surface 20T12. The first sub-surface 20T11 is a surface of the first sub-prism 51 and the second sub-surface 20T12 is a surface of the third sub-prism 53. The second light-transmitting surface 20T2 includes a third sub-surface and a fourth sub-surface 20T22. The third sub-surface 20T21 is another surface of the first sub-prism 51 and the fourth sub-surface 20T22 is another surface of the third sub-prism 53. The third light-transmitting surface 20T3 is a surface of the second sub-prism 52.

Specifically, as shown in FIG. 4, the optical conversion member 20 includes the first sub-prism 51, the second sub-prism 52 spliced with the first sub-prism 51, and the third sub-prism 53 spliced with the second sub-prism 52. The first sub-prism 51 and the third sub-prism 53 are spliced and arranged on two sides of the second sub-prism 52.

Specifically, the first sub-prism 51 and the second sub-prism 52 can be adhered and spliced by an adhesive layer, the third sub-prism 53 and the second sub-prism 52 can be adhered and spliced by an adhesive layer, and a splicing method can be same as or similar to that described in the third embodiment, and will not be reiterated herein.

Specifically, the first sub-reflective film 20R1 is disposed between the splicing surface of the first sub-prism 51 and the splicing surface of the second sub-prism 52, i.e., the first sub-reflective film 20R1 is located on a surface of the first sub-prism 51 or a surface of the second sub-prism 52 at a splicing position. The second sub-reflective film 20R2 is disposed between the splicing surface of the third sub-prism 53 and the splicing surface of the second sub-prism 52, i.e., the second sub-reflective film 20R2 is located on a surface of the third sub-prism 53 or a surface of the sub-prism 52 at a splicing position.

Specifically, materials or structures of the first sub-reflective film 20R1 and the second sub-reflective film 20R2 are same as or similar to the first reflective film 20R in the third embodiment, and are not reiterated herein.

Specifically, the first light-transmitting surface 20T1 includes the first sub-surface 20T11 and the second sub-surface 20T12. The first sub-surface and the second sub-surface 20T12 are a surface of the first sub-prism 51 and a surface of the third sub-prism 53, respectively. The first sub-surface is a surface of the first sub-prism 51 adjacent to the first sub-backlight module 101, and the second sub-surface 20T12 is a surface of the third sub-prism 53 adjacent to the second sub-backlight module 102.

Specifically, the second light-transmitting surface 20T2 includes the third sub-surface 20T21 and the fourth sub-surface 20T22. The third sub-surface 20T21 and the fourth sub-surface 20T22 are each another surface of the first sub-prism 51 and the third sub-prism 53, respectively. The third sub-surface 20T21 is a surface of the first sub-prism 51 adjacent to the second display area AA2, and the fourth sub-surface 20T22 is a surface of the third sub-prism 53 adjacent to the second display area AA2.

Specifically, the third light-transmitting surface 20T3 is a surface of the second sub-prism 52. The third light-transmitting surface 20T3 is a surface of the second sub-prism 52 adjacent to the infrared sensor 400.

Specifically, FIG. 6 illustrates paths of visible light KL and infrared light HL. The first sub-reflective film 20R1 reflects the visible light KL of the first sub-backlight module 101 to enter the second display area AA2, and the second sub-reflective film 20R2 reflects the visible light KL of the second sub-reflective film 20R2 to enter the second display area AA2, so that light entering the second display area AA2 is uniform, and the second display area AA2 displays images with uniform brightness.

Furthermore, the first sub-backlight module 101 is disposed opposite to the second sub-backlight module 102, a light-emitting surface of the first sub-backlight module 101 is disposed toward the second sub-backlight module 102, and a light-emitting surface of the second sub-backlight module 102 is disposed toward the first sub-backlight module 101, so that the light entering the second display area AA2 is more uniform, and brightness of the second display area AA2 when displaying images is more uniform, thereby enhancing the brightness of the second display area AA2.

Specifically, through having the second sub-prism 52 arranged, the infrared light HL is prevented from being greatly refracted after passing through the splicing surface of the first sub-reflective film 20R1 or the splicing surface of the second sub-reflective film 20R2, and the infrared light HL entering the infrared sensor 400 are prevented from crosstalk and confusion, and the accuracy and the sensitivity of the infrared sensor 400 while working are enhanced.

In some embodiments, the second sub-prism 52 is in a plane-symmetric structure with respect to a central plane 801 thereof, the central plane 801 is perpendicular to the display panel 100, and the first sub-prism 51 and the third sub-prism 53 are arranged symmetrically relative to the central plane 801 of the second sub-prism 52.

Specifically, the second sub-prism 52 having the plane-symmetric structure with respect to the central plane 801 thereof, the central plane 801 being perpendicular to the display panel 100, and the first sub-prism 51 and the third sub-prism 53 being symmetrical with respect to the central plane 801 of the second sub-prism 52 makes the light entering the second display area AA2 more uniform, and the accuracy and the sensitivity of the infrared sensor 400 while working are enhanced.

Specifically, the central plane 801 of the second sub-prism 52 is a plane where a center line of the second sub-prism 52 is located. The central plane 801 is perpendicular to the display panel 100, and the second sub-prism 52 has the plane-symmetric structure with respect to the central plane 801.

Fifth Embodiment

This embodiment is similar to any one of the display device 1000 described in the second embodiment, and differences are further described in detail in specific implementations of the display device 1000 as follows. References are made to FIG. 7 and FIG. 8.

In some embodiments, the optical conversion member 20 includes the first sub-prism 51 corresponding to the first display area AA1 and the second display area AA2, and the second sub-prism 52 corresponding to the second display area AA2. The first sub-prism 51 and the second sub-prism 52 are spliced to each other, the second sub-prism 52 is located on a side of the first sub-prism 51 away from the display panel 100, and the first reflective film 20R is arranged on the splicing surface of the first sub-prism 51 and the splicing surface of the second sub-prism 52. The optical conversion member 20 is also provided with a second reflective film 201R corresponding to the first display area AA1 and located on a surface of the first sub-prism 51. The second reflective film 201R reflects visible light, and the second reflective film 201R is disposed inclined relative to the display panel 100. The second light-transmitting surface 20T2 is located between the first reflective film 20R and the second reflective film 201R. The second light-transmitting surface 20T2 is a surface of the first sub-prism 51. The first light-transmitting surface 20T1 is inclined to the display panel 100. The first light-transmitting surface 20T1 is located between the plane where the first reflective film 20R is located and the plane where the second reflective film 201R is located. The first light-transmitting surface 20T1 is another surface of the first sub-prism 51. The third light-transmitting surface 20T3 is a surface of the second sub-prism 52. The light from the sub-backlight module 10 enters the second display area AA2 after being sequentially reflected by the second reflective film 201R and the first reflective film 201R.

Specifically, the optical conversion member 20 further includes the second reflective film 201R corresponding to the first display area AA1 and located on a surface of the first sub-prism 51. In the cross-sectional view of FIG. 7, the second reflective film 201R and the first display area AA1 are overlapped.

Specifically, the second reflective film 201R reflects visible light, the second reflective film 201R does not limit the reflection or transmission of infrared light in this embodiment, and material of the second reflective film 201R can include metals with reflective properties such as aluminum (Al), silver (Ag), etc. The material of the second reflective film 201R can also be same as the material of the first reflective film 20R in this embodiment, and the material or a structure of the first reflective film 20R is same as or similar to that of the third embodiment, and are not reiterated herein.

Specifically, the second reflective film 201R is disposed inclined relative to the display panel 100, i.e., the plane where the second reflective film 201R is located is inclined relative to the display panel 100, in the cross-sectional view, the angle between the extension line of the second reflective film 201R and the display panel 100 is not a right angle.

Specifically, the first light-transmitting surface 20T1 is located between the plane where the first reflective film 20R is located and the plane where the second reflective film 201R is located. In the cross-sectional view, the first light-transmitting surface 20T1 is sandwiched between the plane where the first reflective film 20R is located and the plane where the second reflective film 201R is located. In other words, in the cross-sectional view, the first light-transmitting surface 20T1 is sandwiched between the extension line of the first reflective film 20R and the extension line of the second reflective film 201R.

Specifically, the first light-transmitting surface 20T1 is inclined relative to the display panel 100, i.e., the plane where the first light-transmitting surface is located is inclined relative to the display panel 100. In the cross-sectional view, the angle between the extension line of the first light-transmitting surface 20T1 and the surface of the panel 100 is not a right angle.

Specifically, as shown in FIG. 8, the light (visible light KL) of the sub-backlight module 10 enters the second display area AA2 after being sequentially reflected by the second reflective film 201R and the first reflective film 20R. FIG. 8 also illustrates that the infrared light HL enters the infrared sensor 400.

Specifically, the first light-transmitting surface 20T1 is inclined relative to the display panel 100, and the sub-backlight module 10 is inclined relative to the display panel 100, which can reduce a thickness of the display device 1000.

Specifically, the second light-transmitting surface 20T2 is located between the first reflective film 20R and the second reflective film 201R, and is a surface of the first sub-prism 51. The first light-transmitting surface 20T1 is inclined relative to the display panel 100. The first light-transmitting surface 20T1 is located between the plane where the first reflective film 20R is located and the plane where the second reflective film 201R is located. The first light-transmitting surface is another surface of the first sub-prism 51. The third light-transmitting surface 20T3 is a surface of the second sub-prism 52. The first light-transmitting surface 20T1 is a surface of the first sub-prism 51 adjacent to the sub-backlight module 10, the second light-transmitting surface 20T2 is a surface of the first sub-prism 51 adjacent to the second display area AA2, and the third light-transmitting surface 20T3 is a surface of the second sub-prism 52 adjacent to the infrared sensor 400.

Specifically, the first sub-prism 51 and the second sub-prism 52 are respectively located on both of the sides of the first reflective film 20R. The first sub-prism 51 and the second sub-prism 52 can be adhered and spliced by an adhesive layer, and the splicing method is same as or similar to that described in the third embodiment, and will not be reiterated herein.

Specifically, a function of the second sub-prism 52 is same as or similar to that of the third embodiment, and will not be reiterated herein.

Furthermore, in some embodiments, the normal emitting light of the sub-backlight module 10 is incident perpendicular to the display panel 100 after passing through the prism group 50.

Specifically, regardless of how the second reflective film 201R and the first reflective film 20R are inclined relative to the display panel 100, as long as the normal emitting light from the sub-backlight module 10 passes through the prism group 50 and is then incident perpendicular to the display panel 100, non-normal emitting light from all directions can uniformly enters the second display area AA2, and the normal emitting light from the sub-backlight module 10 is reflected by the first reflective film 20R and then enters all portions of the second display area AA2, so that the light of the sub-backlight module 10 entering the second display area AA2 from all directions are uniform and symmetrical, which enhances the brightness uniformity of the second display AA2 when displaying images.

Sixth Embodiment

This embodiment is similar to any one of the display device 1000 described in the third embodiment, the difference is that: positions of the sub-backlight module 10 and the infrared sensor 400 are interchanged, and the first reflective film 20R transmits visible light and reflects infrared light. This embodiment is similar to any one of the display device 1000 described in the first embodiment, and differences are further described in detail in specific implementations of the display device 1000 as follows. References are made to FIG. 9 and FIG. 10.

In some embodiments, the sub-backlight module 10 is disposed corresponding to the second display area AA2, the infrared sensor 400 is disposed corresponding to the first display area AA1, the optical conversion member 20 is disposed between the sub-backlight module 10 and the display panel 100, the first reflective film 20R transmits visible light and reflects infrared light.

Specifically, the optical conversion member 20 includes the first light-transmitting surface 20T1 corresponding to the sub-backlight module 10, the second light-transmitting surface 20T2 corresponding to the second display area AA2, and the third light-transmitting surface 20T3 corresponding to the infrared sensor 400.

Specifically, the sub-backlight module 10 is disposed corresponding to the second display area AA2, and the optical conversion member 20 is disposed between the sub-backlight module 10 and the display panel 100, i.e., the optical conversion member 20 is disposed between the second display area AA2 and the sub-backlight module 10. In the schematic cross-sectional view, the second display area AA2, the optical conversion member 20, and the sub-backlight module 10 are overlappingly arranged.

Specifically, the infrared sensor 400 is disposed corresponding to the first display area AA1, and the infrared sensor 400 receives the infrared light that passes through the second display area AA2 and then reflected by the first reflective film 20R, but the infrared sensor 400 is located corresponding to the first display area AA1 as for positioning. That is, the infrared sensor 400 is disposed on a side of the first display area AA1, and the infrared sensor 400 receives the infrared light that passes through the second display area AA2 and then reflected by the first reflective film 20R, but does not block the sub-backlight module 10 from providing a backlight source for the second display area AA2.

Specifically, the first reflective film 20R transmits visible light and reflects infrared light, and the first reflective film 20R separates visible light and infrared light. The first reflective film 20R transmits the visible light emitted by the sub-backlight module 10 to the second display area AA2, so that the second display area AA2 displays images. The first reflective film 20R reflects infrared light, so that the infrared light from outside can reach the infrared sensor 400 through the first reflective film 20R, and the sub-backlight module 10 and the infrared sensor 400 do not interfere the light emitting or the light receiving of each other, so as to achieve the function of displaying images in the second display area AA2 while the infrared sensor 400 continues working. The infrared sensor 400 can be an infrared camera. Therefore, the display device 1000 of this embodiment solves the problem of the conventional notched screen being unable to display images at the notched portion, thereby achieving the totally full screen.

Specifically, in some embodiments, an angle between the first reflective film 20R and the display panel ranges from 35 degrees to 55 degrees.

Specifically, as shown in the cross-sectional view of FIG. 10, the angle between the extension line of the first reflective film 20R and the surface of the display panel 100 is α, and the angle α between the first reflective film 20R and the display panel 100 is greater than or equal to 35 degrees, and less than or equal to 55 degrees.

Specifically, an appropriate range of the angle α between the first reflective film 20R and the display panel 100 is selected, so that the infrared light HL can reach infrared sensor 400 fully and efficiently.

Specifically, in some embodiments, the angle between the first reflective film 20R and the display panel 100 is 45 degrees.

Specifically, the angle α between the first reflective film 20R and the display panel 100 is 45 degrees. At this time, the infrared light HL passing through the second display area AA2 perpendicularly can be incident on the infrared sensor 400 in the direction parallel to the display panel 100, so that the infrared light entering the infrared sensor 400 is prevented from crosstalk and confusion, and the accuracy and the sensitivity of the infrared sensor 400 while working are enhanced.

In some embodiments, the optical conversion member 20 includes the first sub-prism 51 and the second sub-prism 52 spliced with each other, the second light-transmitting surface 20T2 and the third light-transmitting surface are respectively different surfaces of the first sub-prism 51, the light-transmitting surface 20T2 is a surface of the second sub-prism 52, and the first reflective film 20R is disposed between the splicing surface of the first sub-prism 51 and the splicing surface of the second sub-prism 52.

Specifically, the second light-transmitting surface 20T2 and the third light-transmitting surface 20T3 are respectively different surfaces of the first sub-prism 51, and the first light-transmitting surface 20T2 is a surface of the second sub-prism 52. The first light-transmitting surface 20T1 is the surface of the first sub-prism 51 adjacent to the sub-backlight module 10, the second light-transmitting surface 20T2 is the surface of the second sub-prism 52 adjacent to the second display area AA2, and the third light-transmitting surface 20T3 is the surface of the second sub-prism 52 adjacent to the infrared sensor 400.

Specifically, the first sub-prism 51 and the second sub-prism 52 are spliced and arranged on both of the sides of the first reflective film 20R, and the refractive indices on both of the sides of the first reflective film 20R are the same, the visible light KL emitted by the sub-backlight module 10 can be prevented from greatly refracted when passing through the splicing surfaces 70, so that the visible light KL emitted by the sub-backlight module 10 is not greatly deflected in an incident direction when passing through the splicing surfaces 70. The light emitted by the sub-backlight module 10 also includes non-normal emitting light. The non-normal emitting light from all directions can uniformly enters the second display area AA2, and the normal emitting light from the sub-backlight module 10 is reflected by the first reflective film 20R and then enters all portions of the second display area AA2, so that the light of the sub-backlight module 10 entering the second display area AA2 from all directions are uniform and symmetrical, which enhances the brightness uniformity of the second display AA2 when displaying images.

It should be noted that the normal emitting light refers to light emitted perpendicular to the light-emitting surface of the sub-backlight module 10, and the non-normal emitting light refers to the light that is not perpendicular to the light-emitting surface of the sub-backlight module 10.

Specifically, in some embodiments, the optical conversion 20 adopts the prism group 50. The prism group 50 includes two sub-prisms spliced with each other. The first reflective film 20R is arranged on the splicing surfaces 70 of the two sub-prisms. The first light-transmitting surface 20T1 and the third light-transmitting surface 20T3 are surfaces of the two sub-prisms, respectively. The second light-transmitting surface 20T2 is a surface of one of the sub-prisms.

Specifically, the optical conversion 20 adopts the prism group 50. The prism group 50 includes the two sub-prisms spliced with each other. As shown in FIG. 9, the prism group 50 includes the first sub-prism 51 and the second sub-prism 52 spliced with each other. The first sub-prism 51 and the second sub-prism 52 are located on two of the sides of the first reflective film 20R, respectively. The first sub-prism 51 and the second sub-prism 52 can be adhered and spliced by an adhesive layer, such as an optical adhesive layer (optical clear resin, OCR, or optical clear adhesive, OCA).

Specifically, the first reflective film 20R is disposed between the splicing surface of the first sub-prism 51 and the splicing surface of the second sub-prism 52, and the first sub-prism 51 or the second sub-prism 52 are provided with the reflective film 20R on the splicing surfaces, respectively. For example, the first reflective film 20R is a coating layer that transmits visible light and reflects infrared light.

Specifically, furthermore, the prism group 50, the sub-prisms, the first sub-prism 51, and the second sub-prism 52 can all made of optical glass, which is not limited herein.

In some embodiments, the first sub-prism 51 and the second sub-prism 52 are symmetrically arranged with respect to the first reflective film 20R.

Specifically, the first sub-prism 51 and the second sub-prism 52 are symmetrically arranged with respect to the first reflective film 20R. At this time, the angle between the first reflective film 20R and the display panel 100 is 45 degrees. The normal emitting light from the sub-backlight module 10, after passing through the first reflective film 20R, enters the second display area AA2 in the direction perpendicular to the display panel 100. Therefore, the infrared light passing through the second display area AA2 perpendicularly can enter the infrared sensor 400 perpendicularly after being reflected by the first reflective film 20R, so as to enhance the brightness uniformity of the second display AA2 when displaying images and the accuracy and sensitivity of the infrared sensor 400 while working.

It should be noted that, in the display device 1000 in any of the above embodiments, the light-transmitting surface 20T includes the first light-transmitting surface 20T1 corresponding to the sub-backlight module 10, the second light-transmitting surface 20T2 corresponding to the second display area AA2, and the third light-transmitting surface 20T3 corresponding to the infrared sensor 400. Preferably, the first light-transmitting surface 20T1 is parallel to the light-emitting surface of the sub-backlight module 10, the second light-transmitting surface 20T2 is parallel to the second display area AA2 or the surface of the display panel 100, and the third light-transmitting surface 20T3 is parallel to a receiving surface of the infrared sensor 400, so that transmitting directions of the visible light or the infrared light is perpendicularly incident or perpendicularly transmitted through said light-transmitting surfaces 20T remain unchanged, which facilitates enhancing the brightness uniformity of the second display AA2 when displaying images, and enhancing the accuracy and sensitivity of the infrared sensor 400 while working.

It should be noted that, in the display device 1000 in any of the above embodiments, when the optical conversion member 20 is the prism group 50, the prism group 50 can be a spliced optical glass or a glued prism group.

It should be noted that, in the display device 1000 in any of the above-mentioned embodiments, since the display panel 100 has no opening, the sub-backlight module 10 is configured as the backlight source of the second display area AA2, the second display area AA2 and the first display area AA1 display consistent images, and the second display area AA2 can not only display images normally, but also prevent problems of brightness or color inconsistency between the images displayed in the second display area AA2 and the images displayed in the first display area AA1 from occurring, and also prevents a problem of interference between the infrared sensor 400 and the sub-backlight module 10 from occurring.

Figure 11:
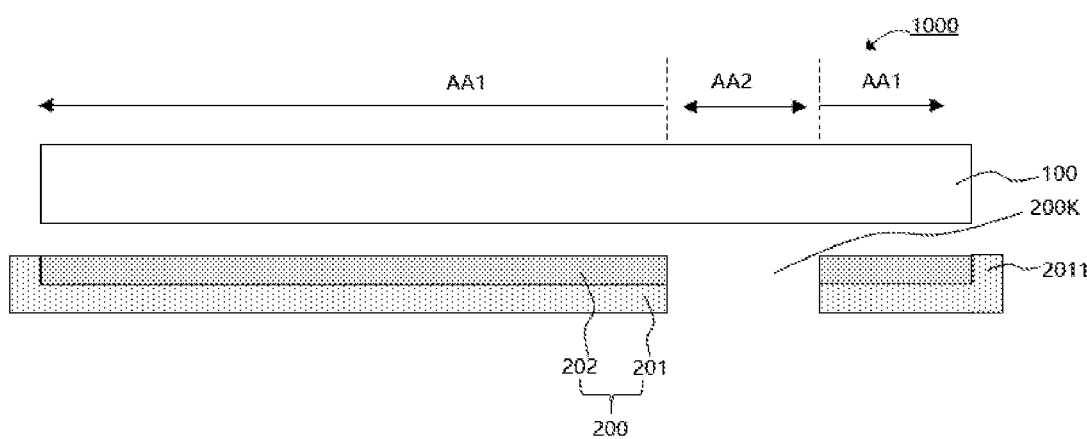
FIG. 11 is a schematic cross-sectional view of a partial structure of the display device provided by an embodiment of the present application.

It should be noted that, in the display device 1000 in any of the above embodiments, compared with the notched screen in the prior art, the display panel 100 of the display device 1000 of the present application is not notched, and the main backlight module 200 is notched. As shown in FIG. 2 and FIG. 11, FIG. 11 is a schematic cross-sectional view of a partial structure of the display device provided by an embodiment of the present application, and FIG. 11 is also a cross-sectional view of a dotted line C-C in FIG. 1. However, FIG. 11 does not Illustrate the reinforcing backlight structure 300, the main backlight module 200 having an opening 200K, and the opening 200K corresponds to the second display area AA2.

It should be noted that, furthermore, in some implementations, in the display device 1000 in any of the above-mentioned embodiments, as shown in FIG. 2 and FIG. 11, the main backlight module 200 can include backboards 201 (iron frame, plastic frame, aluminum frame, etc.) that are sequentially stacked and a composite film layer 202. The composite film layer 202 can include layers and structures such as a reflective film, a light guide plate, a diffuser film, a light enhancement film, etc., which are sequentially stacked, and the main backlight module 200 can be any kind of backlight structures in the prior art, which is not limited herein. Sizes and shapes of each film layers in the composite film layer 202 positioned at the opening 200K position are same as or similar to one another. For example, an opening of the reflective film, sizes and shapes of an opening of the light guide plate, an opening of the diffusion film, an opening of the light enhancement film, and openings of other film layers and structures positioned at the opening hole 200K are same as or similar to one another. As shown in FIG. 2 and FIG. 11, a backboard 201 is provided with a blocking wall 2011 at an outer edge of the main backlight module 200, and the blocking wall 2011 blocks and protects the composite film layer 202. The blocking wall 2011 is not provided on the backboard 201 at a position of the opening 200K, which can prevent the blocking wall 2011 from blocking the light from the sub-backlight module 10 at the position of the opening 200K. In the composite film layer 202, the sizes and the shapes of openings of each of the film layers at the position of the opening 200K are the same or similar, and the blocking wall 2011 is not provided on the backboard 201 at the position of the opening 200K, which can prevent a transition line or a boundary line from occurring between the first display area AA1 and second display area AA2 when displaying images, so that the first display area AA1 and the second display area AA2 display consistent images.

It should be noted that, in the display device 1000 in any of the above-mentioned embodiments, the sub-backlight module 10 can adopt a same backlight type and a same backlight structure as the main backlight module 200, so that a backlight source in the first display area AA1 and a backlight source in the second display area AA2 of the main backlight module 200 are the same or similar, so that the first display area AA1 and the second display area AA2 display consistent images.

It should be noted that, in the display device 1000 in any of the above-mentioned embodiments, the main backlight module 200 and the reinforcing backlight structure 300 can be seamlessly spliced, which can prevent the transition line or the boundary line from occurring between the first display area AA1 and second display area AA2, so that the first display area AA1 and the second display area AA2 display consistent images.

It should be noted that, in the display device 1000 in any of the above-mentioned embodiments, structures of any of the above-mentioned display device 1000 in any of the embodiments can be selected for product manufacturing, according to thickness requirements of the display device 1000, space arrangement requirements of each component, and opening size requirements of the main backlight module 200.

The display device provided by the present application is described in detail above, the specific examples of this document are used to explain principles and embodiments of the present application, and the description of embodiments above is only for helping to understand the present application. Meanwhile, those skilled in the art will be able to change the specific embodiments and the scope of the present application according to the idea of the present application. In the above, the content of the specification should not be construed as limiting the present application. Above all, the content of the specification should not be the limitation of the present application.

What is claimed is:

1. A display device, comprising:
   a display panel comprising a first display area and a second display area, wherein the first display area at least partially surrounds the second display area;
   a main backlight module disposed corresponding to the first display area and providing a backlight source for the first display area; and
   a reinforcing backlight structure comprising a sub-backlight module and an optical conversion member, wherein the optical conversion member is disposed at least corresponding to the second display area, the optical conversion member is disposed on a light-emitting side of the sub-backlight module, and light emitted from the sub-backlight module is emitted to the second display area after passing through the optical conversion member,
   wherein a first reflective film is disposed in the optical conversion member, and the first reflective film is inclined relative to the display panel;
   wherein the display device further comprises an infrared sensor, and the infrared sensor and the sub-backlight module are respectively located on opposite sides of a plane where the first reflective film is located;
   wherein the first reflective film transmits one of infrared light and visible light, and reflects the other;
   wherein the optical conversion member comprises a first light-transmitting surface corresponding to the sub-backlight module, a second light-transmitting surface corresponding to the second display area, and a third light-transmitting surface corresponding to the infrared sensor;
   wherein the infrared sensor is disposed corresponding to the second display area, the sub-backlight module is disposed corresponding to the first display area, the optical conversion member is disposed between the infrared sensor and the display panel, and the first reflective film transmits infrared light and reflects visible light;
   wherein the first reflective film comprises a first sub-reflective film and a second sub-reflective film, the first sub-reflective film and the second sub-reflective film are respectively inclined relative to the display panel and intersect with the second light-transmitting surface;
   wherein the sub-backlight module comprises a first sub-backlight module and a second sub-backlight module, the first sub-backlight module and the infrared sensor are respectively located on opposite sides of a plane where the first sub-reflective film is located, the second sub-backlight module and the infrared sensor are respectively located on opposite sides of a plane where the second sub-reflective film is located; and
   wherein light emitted from the first sub-backlight module and light emitted from the second sub-backlight module are respectively reflected by the first sub-reflective film and the second sub-reflective film and then emit toward the second display area.

2. The display device according to claim 1, wherein an angle between the first reflective film and the display panel ranges from 35 degrees to 55 degrees.

3. The display device according to claim 2, wherein the angle between the first reflective film and the display panel is 45 degrees.

4. The display device according to claim 1, wherein the optical conversion member comprises a first sub-prism and a second sub-prism that are spliced with each other, the first light-transmitting surface and the second light-transmitting surface are respectively different surfaces of the first sub-prism, and the third light-transmitting surface is a surface of the second sub-prism;

wherein the first reflective film is arranged between a splicing surface of the first sub-prism and a splicing surface of the second sub-prism.

5. The display device according to claim 4, wherein the first sub-prism and the second sub-prism are symmetrically arranged with respect to the first reflective film.

6. The display device according to claim 1, wherein an angle between the first sub-reflective film and the display panel and an angle between the second sub-reflective film and the display panel both ranges from 35 degrees to 55 degrees.

7. The display device according to claim 6, wherein an angle between the first sub-reflective film and the second sub-reflective film is 90 degrees, and the angle between the first sub-reflective film and the display panel is 45 degrees.

8. The display device according to claim 1, wherein the optical conversion member comprises a first sub-prism, a second sub-prism spliced with the first sub-prism, and a third sub-prism spliced with the second sub-prism, wherein the first sub-reflective film is arranged between a splicing surface of the first sub-prism and a splicing surface of the second sub-prism, and the second sub-reflective film is arranged between a splicing surface of the third sub-prism and another splicing surface of the second sub-prism;

wherein the first light-transmitting surface comprises a first sub-surface and a second sub-surface, and the first sub-surface is a surface of the first sub-prism and the second sub-surface is a surface of the third sub-prism; the second light-transmitting surface comprises a third sub-surface and a fourth sub-surface, and the third sub-surface is another surface of the first sub-prism and the fourth sub-surface is another surface of the third sub-prism; and the third light-transmitting surface is a surface of the second sub-prism.

9. The display device according to claim 8, wherein the second sub-prism is in a plane-symmetric structure with respect to a central plane thereof, the central plane is perpendicular to the display panel, and the first sub-prism and the third sub-prism is arranged plane-symmetrically with respect to the central plane of the second sub-prism.

* * * * *